US012581399B2

(12) United States Patent
Moyal et al.

(10) Patent No.: US 12,581,399 B2
(45) Date of Patent: Mar. 17, 2026

(54) DYNAMIC ESIM CONFIGURATION BASED ON AVAILABLE WI-FI INTERNET BANDWIDTH

(71) Applicant: INTERNATIONAL BUSINESS MACHINES CORPORATION, Armonk, NY (US)

(72) Inventors: Shailendra Moyal, Pune (IN); Sarbajit K. Rakshit, Kolkata (IN); Akash U. Dhoot, Pune (IN); Shilpa Bhagwatprasad Mittal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 17/823,978

(22) Filed: Sep. 1, 2022

(65) Prior Publication Data

US 2024/0080756 A1 Mar. 7, 2024

(51) Int. Cl.
*H04W 48/18* (2009.01)
*H04W 4/50* (2018.01)
*H04W 24/10* (2009.01)
*H04W 28/20* (2009.01)
*H04W 88/06* (2009.01)

(52) U.S. Cl.
CPC ............. *H04W 48/18* (2013.01); *H04W 4/50* (2018.02); *H04W 24/10* (2013.01); *H04W 28/20* (2013.01); *H04W 88/06* (2013.01)

(58) Field of Classification Search
CPC ........... H04W 64/003; H04W 52/0261; H04W 4/029; H04W 8/183; H04W 36/008175
USPC ....................................................... 370/338
See application file for complete search history.

(56) References Cited

U.S. PATENT DOCUMENTS

| | | | | | |
|---|---|---|---|---|---|
| 9,674,880 | B1 * | 6/2017 | Egner | ................ | A61B 5/14542 |
| 9,756,547 | B2 * | 9/2017 | Egner | ................ | H04W 64/003 |
| 9,775,562 | B2 * | 10/2017 | Egner | ................ | A61B 5/14503 |
| 9,780,823 | B2 * | 10/2017 | Egner | .................... | H04B 1/385 |
| 10,405,357 | B2 * | 9/2019 | Egner | ................ | A61B 5/14546 |

(Continued)

FOREIGN PATENT DOCUMENTS

| | | | | | |
|---|---|---|---|---|---|
| CN | 110301143 | A | * | 10/2019 | ........ H04W 52/0264 |
| CN | 105916144 | B | * | 1/2020 | ............ H04W 12/08 |

(Continued)

OTHER PUBLICATIONS

M. Alabadi, A. Habbal and X. Wei, "Industrial Internet of Things: Requirements, Architecture, Challenges, and Future Research Directions," in IEEE Access, vol. 10, pp. 66374-66400, 2022, doi: 10.1109/Access.2022.3185049. (Year: 2022).*

(Continued)

*Primary Examiner* — William D Cumming
(74) *Attorney, Agent, or Firm* — Anthony M. Pallone

(57) ABSTRACT

A method, computer system, and computer program product for eSIM configuration includes identifying contextual information of one or more minimum performance requirements of an internet-based activity being performed via a mobile device, identifying a Wi-Fi network in use for performance of the internet-based activity, evaluating the performance of the internet-based activity on the Wi-Fi network in use. In, and reconfiguring an eSIM of the mobile device to compensate in response to a determined deviation from the one or more minimum performance requirements.

20 Claims, 2 Drawing Sheets

(56) References Cited

U.S. PATENT DOCUMENTS

| | | | | |
|---|---|---|---|---|
| 10,684,350 | B2 * | 6/2020 | Dupray | H04W 4/029 |
| 10,939,367 | B1 * | 3/2021 | Koshy | H04W 36/008375 |
| 11,115,810 | B1 | 9/2021 | Indurkar | |
| 11,159,978 | B2 * | 10/2021 | Soma | H04L 45/245 |
| 11,265,715 | B2 * | 3/2022 | Kang | H04L 63/08 |
| 11,576,111 | B2 * | 2/2023 | Koshy | H04W 36/328 |
| 11,729,618 | B2 * | 8/2023 | Kang | H04W 12/35 |
| | | | | 370/338 |
| 11,971,491 | B2 * | 4/2024 | Dupray | H04W 4/029 |
| 12,022,564 | B2 * | 6/2024 | Mene | H04W 8/205 |
| 2013/0073473 | A1 * | 3/2013 | Heath | G06Q 30/0241 |
| | | | | 705/319 |
| 2017/0208540 | A1 * | 7/2017 | Egner | H04W 64/003 |
| 2017/0223601 | A1 * | 8/2017 | Egner | A61B 5/14532 |
| 2017/0238346 | A1 * | 8/2017 | Egner | A61B 5/14503 |
| | | | | 370/338 |
| 2017/0257129 | A1 * | 9/2017 | Egner | H04W 52/0261 |
| 2020/0084614 | A1 | 3/2020 | Xu | |
| 2020/0314628 | A1 * | 10/2020 | Panchal | H04L 41/5022 |
| 2020/0404501 | A1 * | 12/2020 | Kang | H04W 8/183 |
| 2021/0234778 | A1 * | 7/2021 | Bendigeri | H04L 69/14 |
| 2021/0235311 | A1 * | 7/2021 | Soma | H04L 45/245 |
| 2021/0235369 | A1 * | 7/2021 | Koshy | H04W 64/003 |
| 2021/0235460 | A1 * | 7/2021 | Bendigeri | H04W 48/18 |
| 2022/0182828 | A1 * | 6/2022 | Kang | H04L 63/08 |
| 2022/0394457 | A1 * | 12/2022 | Mene | H04M 15/8214 |
| 2023/0038817 | A1 * | 2/2023 | Rakshit | G06N 3/0464 |
| 2023/0055342 | A1 * | 2/2023 | Narula | H04L 67/1044 |
| 2024/0080756 | A1 * | 3/2024 | Moyal | H04W 48/18 |
| 2024/0129709 | A1 * | 4/2024 | Santhar | H04W 8/183 |
| 2024/0267722 | A1 * | 8/2024 | Padova | H04W 8/183 |
| 2024/0276203 | A1 * | 8/2024 | Nagarajan | H04W 48/16 |
| 2025/0218263 | A1 * | 7/2025 | Hayek | H04W 84/12 |
| 2025/0227455 | A1 * | 7/2025 | Vaidyanathan | H04W 8/20 |

FOREIGN PATENT DOCUMENTS

| | | | | | |
|---|---|---|---|---|---|
| CN | 112469071 | A | | 3/2021 | |
| CN | 120642366 | A | * | 9/2025 | H04W 60/00 |
| EP | 4336876 | A1 | * | 3/2024 | H04W 4/60 |
| KR | 20200145775 | A | * | 12/2020 | H04W 8/24 |
| WO | WO-2024054333 | A1 | * | 3/2024 | H04W 12/35 |
| WO | WO-2024167583 | A1 | * | 8/2024 | H04W 60/00 |
| WO | WO-2025151360 | A1 | * | 7/2025 | H04W 4/60 |
| WO | WO-2025159892 | A1 | * | 7/2025 | H04W 8/205 |
| WO | WO-2025196787 | A1 | * | 9/2025 | H04L 43/0864 |

OTHER PUBLICATIONS

Author Unknown, "Who is set to benefit from eSIM technology?," IoT Now, Accessed: May 19, 2022, https://www.iot-now.com/2021/11/04/91229-set-benefit-esim-technology/, 14 pages.

Disclosed Anonymously, "Dynamic eSIM Configuration Based upon Derived Contextual User Activity and Provider Capability," IP.com, IP.com No. IPCOM000267925D, IP.com Publication Date: Dec. 6, 2021, 4 pages.

Disclosed Anonymously, "Machine Learning to Select Best Network Access Point," IP.com, IP.com No. IPCOM000252087D, IP.com Publication Date: Dec. 15, 2017, 35 pages.

Pan, "Analysis of Wi-Fi performance data for a Wi-Fi throughput prediction approach," KTH School of Information and Communications Technology (ICT) Communication System, Jun. 2017, https://www.diva-portal.org/smash/get/diva2:1148996/FULLTEXT01.pdf, 50 pages.

Teal Communications Staff, "Why Dynamic eUICC/ eSIM Tech is Superior to Static Multi-IMSI," Tealcom, May 18, 2021, https://www.tealcom.io/post/why-dynamic-euicc-esim-tech-is-superior-to-static-multi-imsi/, 7 pages.

\* cited by examiner

100

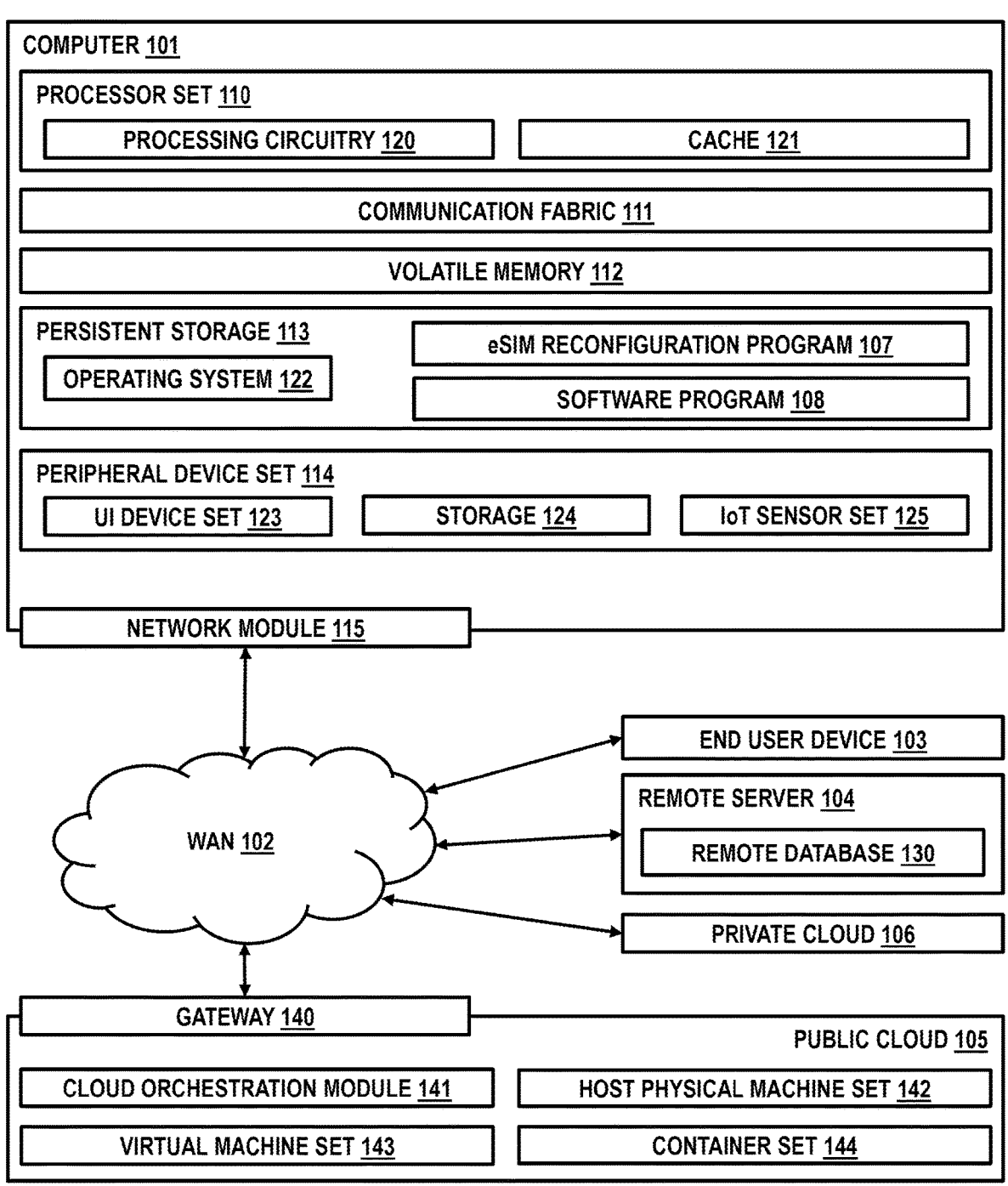

COMPUTER 101

PROCESSOR SET 110

PROCESSING CIRCUITRY 120　　CACHE 121

COMMUNICATION FABRIC 111

VOLATILE MEMORY 112

PERSISTENT STORAGE 113

OPERATING SYSTEM 122 eSIM RECONFIGURATION PROGRAM 107

SOFTWARE PROGRAM 108

PERIPHERAL DEVICE SET 114

UI DEVICE SET 123　　STORAGE 124　　IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

*Figure 1*

DYNAMIC ESIM CONFIGURATION BASED ON AVAILABLE WI-FI INTERNET BANDWIDTH

BACKGROUND

The present invention relates generally to the field of computing, and more particularly to smart cards.

A smart card, chip card, or integrated circuit card (ICC or IC card) is a physical electronic authorization device used to control access to an electronic resource. Smart cards are typically a plastic credit card-sized card with an embedded integrated circuit chip to store and process data. Many smart cards include a pattern of metal contacts to electrically connect to the internal chip, however, some smart cards are contactless, while yet others implement both contactless and contact interfaces. Smart cards may provide personal identification, authentication, data storage, and application processing. Application of smart card technology may be found across many industries including the financial, computer security, mobile phone, public transit, education, and healthcare industries. For example, the subscriber identity/identification modules (SIMs) used in mobile-phone devices are reduced-size smart cards. A SIM card is intended to securely store the international mobile subscriber identity (IMSI) number and its related key, which are used to identify and authenticate subscribers on mobile telephony devices (e.g., mobile phones, computers). Moreover, an embedded-SIM (eSIM) is a form of programmable SIM card that is embedded directly into a device. Rather than an integrated circuit located on a removeable universal ICC (UICC), an eSIM consists of software installed onto an embedded-UICC (eUICC) chip permanently attached to a device.

SUMMARY

According to one embodiment, a method, computer system, and computer program product for eSIM configuration. The embodiment may include identifying contextual information of an internet-based activity being performed via a mobile device. The contextual information comprises one or more minimum performance requirements. The embodiment may include identifying a Wi-Fi network in use for performance of the internet-based activity. The embodiment may include evaluating the performance of the internet-based activity on the Wi-Fi network in use. In response to determining a deviation from the one or more minimum performance requirements, the embodiment may include reconfiguring an eSIM of the mobile device to compensate for the deviation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computer environment according to at least one embodiment.

DETAILED DESCRIPTION

Figure 2:
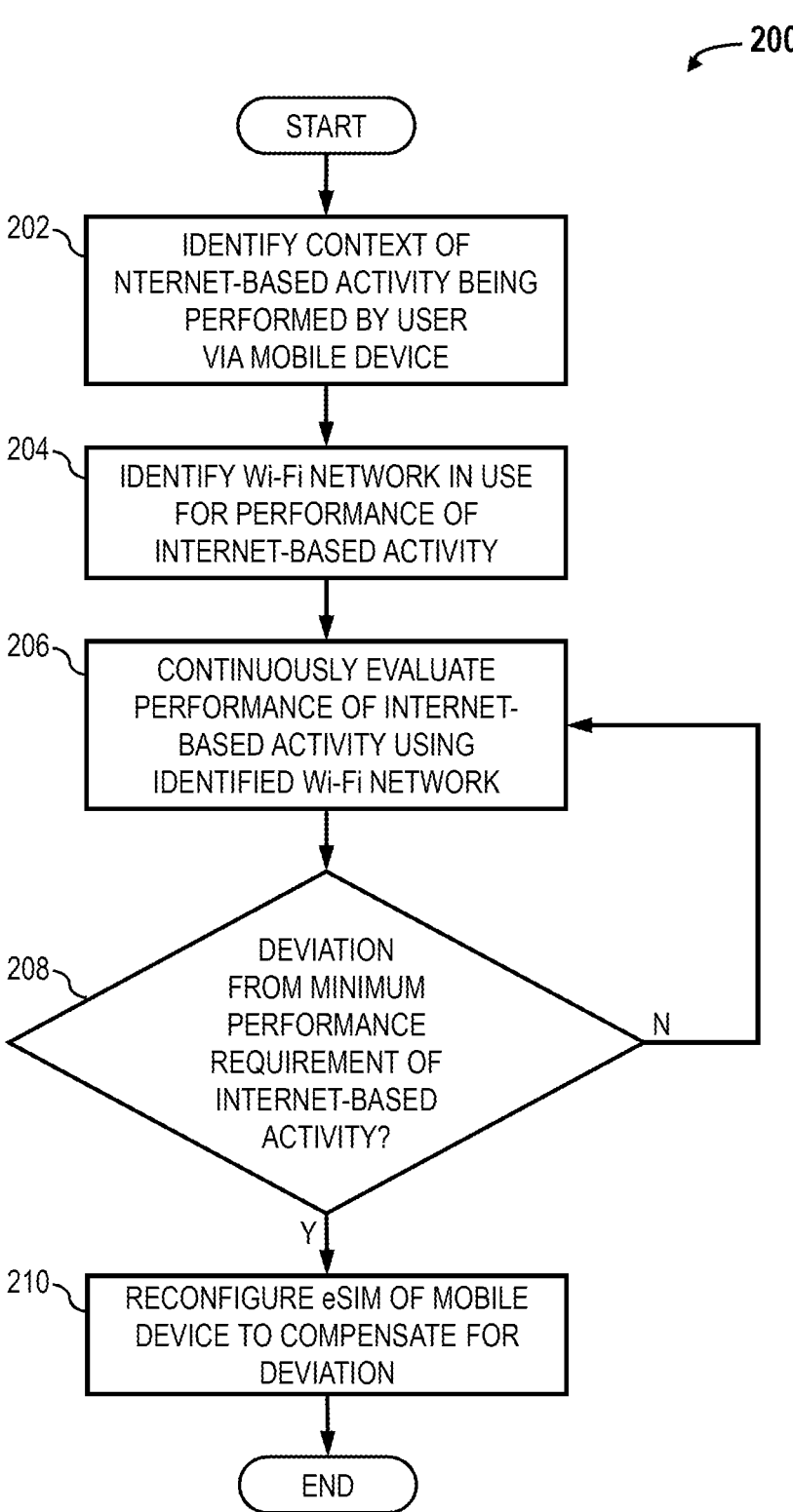
FIG. 2 illustrates an operational flowchart for configuring an eSIM of a mobile device based on available Wi-Fi bandwidth via an eSIM configuration process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to smart cards. The following described exemplary embodiments provide a system, method, and program product to, among other things, configure an eSIM of a mobile device in response to an internet bandwidth requirement of a user while performing an internet-based activity via the device. Therefore, the present embodiment has the capacity to improve the technical field of smart cards by continuously evaluating, while a user is performing an internet-based activity via a mobile device, the internet bandwidth available to the mobile device and dynamically configuring an eSIM of the mobile device to compensate for a realized or predicted deviation from an internet bandwidth requirement of the user while performing the internet-based activity via the mobile device.

As previously described, a smart card, chip card, or integrated circuit card (ICC or IC card) is a physical electronic authorization device used to control access to an electronic resource. Smart cards are typically a plastic credit card-sized card with an embedded integrated circuit chip to store and process data. Many smart cards include a pattern of metal contacts to electrically connect to the internal chip, however, some smart cards are contactless, while yet others implement both contactless and contact interfaces. Smart cards may provide personal identification, authentication, data storage, and application processing. Application of smart card technology may be found across many industries including the financial, computer security, mobile phone, public transit, education, and healthcare industries. For example, the SIMs used in mobile-phone devices are reduced-size smart cards. A SIM card is intended to securely store the IMSI number and its related key, which are used to identify and authenticate subscribers on mobile telephony devices (e.g., mobile phones, computers). Moreover, an eSIM is a form of programmable SIM card that is embedded directly into a device. Rather than an integrated circuit located on a removeable UICC, an eSIM consists of software installed onto an embedded-UICC chip permanently attached to a device.

As noted above, an eSIM is a virtualized SIM card profile installed onto an eUICC chip permanently mounted to a mobile device. Once an eSIM carrier (i.e., a mobile/wireless network provider) profile has been installed on an eUICC, it operates the same as a physical SIM to identify and authenticate subscribers on mobile devices (e.g., a smartphone) and to enable connection to a cellular network. Additionally, eSIMs allow for remote configuration of wireless carrier provider, data plan, or service plan through software. Due to their size and configuration flexibility, eSIMS may also be integrated within a wide range of Internet-of-Things (IoT) devices (e.g., wearable computing devices, home devices (e.g., smart speakers), laptops, tablets) which require always-on internet connectivity. Such devices which have traditionally connected to Wi-Fi may benefit from the wider availability and security of cellular network (e.g., 4G, 5G) connections as users perform internet-based activities with these devices. For example, a user may initiate a video call on their mobile device (e.g., a smartphone) at a required 8K resolution quality. Although a Wi-Fi network (e.g., public Wi-Fi, organization Wi-Fi) may be available to the user, the available bandwidth of the Wi-Fi network may not be sufficient to support the video call at the required quality. It is also possible that although the available bandwidth of the Wi-Fi network may have been initially sufficient, it has decreased in response to added users of the network and is no longer sufficient to support the video call at the required quality. It may therefore be imperative to have a system in place to dynamically alter the configuration of an eSIM of the user's mobile device so that the user may initiate, or continue, their internet-based activity at the required quality. Thus, embodiments of the present invention may be advantageous to, among other things, identify a context and associated quality requirements (e.g., connection speed, resolution, data amount) of an internet-based activity being performed by a user via a mobile device, identify and quantify Wi-Fi internet bandwidth available to perform the internet-based activity via the mobile device, re-configure an eSIM of the mobile device in response to a change in available Wi-Fi internet bandwidth resulting in a deviation from the associated quality requirements of the internet-based activity, and optimize (e.g., minimize) cost associated with an implemented eSIM configuration. The present invention does not require that all advantages need to be incorporated into every embodiment of the invention.

According to at least one embodiment, while a user is performing an internet-based activity via a mobile device utilizing an available Wi-Fi network, bandwidth of the available Wi-Fi network may be identified. A minimum quality of service (QoS) (e.g., internet connection speed, mobile data quotas, and application settings) for performance of the internet-based activity may be identified. Performance of the internet-based activity according to the identified minimum QoS may be continuously evaluated. According to at least one embodiment, in response to an identified deviation (e.g., a drop) in the performance of the internet-based activity from the identified minimum QoS, an eSIM of the mobile device may be dynamically configured to compensate for the deviation and maintain performance of the internet-based activity according to the identified minimum QoS.

According to at least one other embodiment, before, or while, the user performs the internet-based activity via the mobile device utilizing the available Wi-Fi network, reductions in available bandwidth of the Wi-Fi network may be predicted and, accordingly, the eSIM of the mobile device may be proactively configured to maintain performance of the internet-based activity according to the identified minimum QoS. According to at least one further embodiment, while the user performs the internet-based activity via the mobile device utilizing the available Wi-Fi network, a direction of movement of the user may be identified and, accordingly, the eSIM of the mobile device may be dynamically configured, based on range and bandwidth of a current mobile network provider in the user's direction of movement, to maintain performance of the internet-based activity according to the identified minimum QoS.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to continuously evaluate performance of an internet-based activity via a mobile device using an available Wi-Fi network and, accordingly, reconfigure an eSIM of the mobile device in response to an identified reduction in bandwidth of the available Wi-Fi network so as to maintain performance of the internet-based activity.

Referring to FIG. 1, an exemplary computing environment 100 is depicted, according to at least one embodiment. Computing environment 100 contains an example of an environment for the execution of at least some of the computer code involved in performing the inventive methods, such as eSIM reconfiguration program 107. In addition to eSIM reconfiguration program 107 computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122, software program 108, and eSIM reconfiguration program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in eSIM reconfiguration program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in eSIM reconfiguration program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (a registered trademark of the Bluetooth Special Interest Group (SIG), Inc. of Kirkland, Washington, US) connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, and yet another sensor may be a GPS receiver which provides computer 101 with satellite navigation and geographic location identification capability.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The eSIM reconfiguration program 107 may be a program capable of configuring an eSIM of a mobile device based on identified bandwidth changes of a Wi-Fi network being utilized by the mobile device. For example, eSIM reconfiguration program 107 may continuously evaluate performance of an internet-based activity executing on the Wi-Fi network and, accordingly, reconfigure an eSIM of the mobile device in response to a reduction in bandwidth of the Wi-Fi network so as to maintain a specified level of performance of the internet-based activity. In at least one embodiment, eSIM reconfiguration program 107 may require a user to opt-in to system usage upon opening or installation of the eSIM reconfiguration program 107. Notwithstanding depiction in computer 101, eSIM reconfiguration program 107 may be stored in and/or executed by, individually or in any combination, end user device 103, remote server 104, public cloud 105, and private cloud 106 so that functionality may be separated among the devices. The eSIM reconfiguration method is explained in further detail below with respect to FIG. 2.

Referring now to FIG. 2, an operational flowchart for configuring an eSIM of a mobile device based on available Wi-Fi bandwidth via an eSIM configuration process 200 is depicted according to at least one embodiment. At 202, eSIM reconfiguration program 107 identifies contextual information of an internet-based activity being performed by a user via a mobile device (e.g., a smartphone, a laptop, a smartwatch, or smart glasses) of the user. Contextual information of the internet-based activity may include identification of an activity application (e.g., software program 108), type of activity being performed (e.g., video call, gaming activity, virtual reality (VR)/augmented reality (AR) activity), performance requirements such as minimum internet bandwidth and/or minimum internet connection speed required for performance of the activity, minimum data required for performance of the activity, location of activity performance (e.g., Global Positioning System (GPS) location, work location, home location, public transit location), user and/or organization specified activity application settings/preferences (e.g., resolution quality), and time duration of activity.

According to at least one other embodiment, eSIM reconfiguration program 107 may additionally track data relating to performed internet-based activities, and their respective contextual information, and store the tracked data in a knowledge repository (e.g., storage 124, remote database 130). Moreover, for each performed internet-based activity, a pattern of performance (e.g., time of day, frequency, location) and a pattern of internet bandwidth consumption may each be identified and also stored within the knowledge repository. In doing so, eSIM reconfiguration program 107 may create a historical knowledge corpus relating to performed internet-based activities.

Next, at 204, eSIM reconfiguration program 107 identifies a Wi-Fi network currently in use by the mobile device for performance of the internet-based activity identified at 202. According to at least one embodiment, in identifying the Wi-Fi network currently in use, eSIM reconfiguration program 107 may also identify metrics such as a bandwidth strength and a bandwidth range of the Wi-Fi network. According to at least one other embodiment, eSIM reconfiguration program 107 may additionally track data relating to, and identify patterns of, increased and decreased internet bandwidth consumption of the Wi-Fi network currently in use (e.g., situations, days of the week, and/or time periods where available internet bandwidth drops as a result of increased bandwidth consumption or increases as a result of decreased bandwidth consumption). The bandwidth strength, the bandwidth range, the tracked data, and the identified patterns may be stored within the knowledge repository and associated with the contextual information of the internet-based activity. According to at least one further embodiment, eSIM reconfiguration program 107 may predict availability of Wi-Fi bandwidth in different contextual situations based on the identified patterns stored within the knowledge repository. Moreover, eSIM reconfiguration program 107 may track one or more pending activities (e.g., an in-progress database backup) and predict whether Wi-Fi bandwidth sufficient for a pending activity will be available. It should be noted that the above information (i.e., bandwidth strength, bandwidth range, tracked data, and identified patterns) may be identified/tracked for any Wi-Fi network within range of the mobile device and not just for the Wi-Fi network currently in use.

At 206, eSIM reconfiguration program 107 continuously evaluates performance of the internet-based activity using the Wi-Fi network identified at 204 (i.e., the Wi-Fi network currently in use by the mobile device). Available Wi-Fi networks may commonly be found within office buildings/workplaces as well as within public and home spaces. While such networks allow users to wirelessly connect to the internet and perform a variety of activities, the available bandwidth of a Wi-Fi network may vary over time as additional users connect and disconnect from the network (e.g., bandwidth of a Wi-Fi network at an airport departure gate may decrease as more mobile devices connect to the network and consume bandwidth). As such, there may be times where the Wi-Fi network currently in use by the mobile device does not provide sufficient internet bandwidth for performance of the internet-based activity via the mobile device. According to at least one embodiment, eSIM reconfiguration program 107 may evaluate performance of the internet-based activity, using the Wi-Fi network currently in use, against one or more aspects of the identified contextual information (e.g., minimum internet bandwidth and/or internet connection speed required for performance of the activity, user and/or organization specified activity application settings/preferences) of the internet-based activity.

Next, at 208, eSIM reconfiguration program 107 determines whether performance of the internet-based activity deviates from (e.g., does not meet) one or more of its identified minimum performance requirements or one or more other aspects of its identified contextual information. In making this determination, eSIM reconfiguration program 107 may compare one or more identified metrics of the Wi-Fi network currently in use against one or more aspects of the identified contextual information for the internet-based activity. For example, eSIM reconfiguration program 107 may compare the bandwidth strength of the Wi-Fi network currently in use against the minimum internet bandwidth required for the internet-based activity. A deviation may be found where a comparison indicates that the bandwidth strength of the Wi-Fi network currently in use is below the minimum internet bandwidth required for the internet-based activity. In response to determining that a deviation from one or more minimum performance requirements of the internet-based activity exists (step 208, "Y" branch), the eSIM configuration process 200 may proceed to step 210. In response to determining that a deviation from one or more minimum performance requirements of the internet-based activity does not exist (step 208, "N" branch), the eSIM configuration process 200 may return to step 206 for continued internet-based activity performance evaluation.

According to at least one other embodiment, a forecasted determination of whether performance of the internet-based activity will deviate from one or more of its identified minimum performance requirements or one or more other aspects of its identified contextual information may be made by eSIM reconfiguration program 107 based on data within the historical knowledge corpus. For example, eSIM reconfiguration program 107 may access the knowledge repository and reference an identified pattern of increased internet bandwidth consumption of the Wi-Fi network currently in use, as well as the time duration and identified pattern of internet bandwidth consumption of the internet-based activity. A forecasted deviation may exist where eSIM reconfiguration program 107 determines that available internet bandwidth of the Wi-Fi network currently in use will decrease during the time duration of the internet-based activity and result in activity performance which does not meet the minimum performance requirements. In response to a determined forecasted deviation, the eSIM configuration process 200 may proactively proceed to step 210.

According to at least one further embodiment, a forecasted determination of whether performance of the internet-based activity will deviate from one or more of its identified minimum performance requirements or one or more other aspects of its identified contextual information may be made by eSIM reconfiguration program 107 based on movement of the user. In such an embodiment, the contextual information of the internet-based activity may also include identified user movement as they perform the activity. For example, eSIM reconfiguration program 107 may utilize GPS receivers of the mobile device to identify a geographic location of the user and track their directional movement while performing the internet-based activity. Furthermore, eSIM reconfiguration program 107 may access the knowledge repository to evaluate bandwidth strength and range of the Wi-Fi network currently in use as it relates to the directional movement of the user (e.g., assess bandwidth strength and range in the direction of user movement). A forecasted deviation may exist where eSIM reconfiguration program 107 determines that available internet bandwidth of the Wi-Fi network currently in use will decrease or fall out of range if the user continues their directional movement; thus, resulting in performance of the internet-based activity which does not meet its minimum performance requirements. In response to a determined forecasted deviation, the eSIM configuration process 200 may proactively proceed to step 210.

At 210, in response to a determined deviation, or forecasted deviation, from one or more minimum performance requirements of the internet-based activity, eSIM reconfiguration program 107 dynamically reconfigures an eSIM of the mobile device to compensate for the determined deviation. Consequently, through the use of the eSIM configuration process 200, performance of the internet-based activity may be maintained, or enabled, in accordance with one or more aspects of its identified contextual information. According to embodiments of the present invention, the mobile device of the user may have an eSIM capable of being configured locally by eSIM reconfiguration program 107 or remotely by a mobile network provider executing an instance of eSIM reconfiguration program 107 and currently registered with the eSIM of the mobile device. According to at least one embodiment, in configuring the eSIM of the mobile device, eSIM reconfiguration program 107 may select among different mobile network providers for registration with the eSIM of the mobile device and/or select among different data/service plans of a registered network provider for use by the mobile device so that performance of the internet-based activity may be continued, or enabled, according to one or more aspects of its identified contextual information (e.g., a mobile network provider and/or a data plan of a provider which provides the internet bandwidth required by the internet-based activity may be selected).

According to another embodiment, where a forecasted deviation from one or more minimum performance requirements of the internet-based activity has been determined, eSIM reconfiguration program 107 may proactively reconfigure the eSIM of the mobile device so that performance of the internet-based activity in accordance with its minimum performance requirements may be maintained. Likewise, eSIM reconfiguration program 107 may, based on historical learning considering multiple parameters from the contextual information of the internet-based activity, proactively reconfigure the eSIM of the mobile device to optimize (e.g., minimize) internet connectivity time. Furthermore, according to an embodiment where a forecasted deviation resulting from tracked movement of the user has been determined, eSIM reconfiguration program 107 may, in proactively reconfiguring the eSIM of the mobile device, compare internet bandwidth strengths and ranges of multiple mobile network providers as they relate to the directional movement of the user.

According to at least one other embodiment, in configuring the eSIM of the mobile device, eSIM reconfiguration program 107 may additionally validate a capability of the mobile device to connect to two different networks in parallel. For example, eSIM reconfiguration program 107 may identify if the mobile device is capable of connecting to an available Wi-Fi network while also connecting to an eSIM-based data plan. Accordingly, where parallel network connection capability is identified, eSIM reconfiguration program 107 may configure the eSIM of the mobile device to utilize multiple networks so that performance of the internet-based activity may be continued, or enabled, according to one or more aspects of its identified contextual information (e.g., using bandwidth from an available Wi-Fi network and an eSIM-based data plan to perform an activity consistent with its minimum internet bandwidth requirement). Moreover, according to at least one further embodiment, in configuring the eSIM of the mobile device, eSIM reconfiguration program 107 may additionally evaluate respective monetary costs associated with the Wi-Fi network currently in use and any eSIM-based data plans available to the mobile device, and, accordingly, optimally configure the eSIM of the mobile device so that one or more aspects of the contextual information for the internet-based activity are satisfied at a minimum cost to the user.

According to at least one embodiment, eSIM reconfiguration program 107 may store details of eSIM reconfiguration (e.g., Wi-Fi network and/or data plan selection, mobile network provider selection, respective monetary costs associated Wi-Fi network and/or eSIM-based data plan selection) for the mobile device may be stored within the knowledge repository and associated with the contextual information of the internet-based activity. Moreover, eSIM reconfiguration program 107 may utilize a blockchain ledger to track performed eSIM reconfigurations for different mobile devices so that pricing associated dynamic eSIM reconfigurations may be based on the changing data consumptions of the mobile devices.

According to at least one further embodiment, in response to the user's performance of the internet-based activity being reduced (e.g., requiring less internet bandwidth due to changing contextual information), or ceased, eSIM reconfiguration program 107 may accordingly reconfigure the eSIM of the mobile device so that internet bandwidth consumption and associated monetary cost may be minimized. For example, if the minimum bandwidth requirement of the internet-based activity being performed by the user decreases, eSIM reconfiguration program 107 may reconfigure the eSIM of the mobile device to utilize a lower cost data plan, a lower cost mobile network provider, a lower cost or free Wi-Fi network, or any combinations thereof, which satisfy the reduced bandwidth requirement of the internet-based activity.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

identifying contextual information of an internet-based activity being performed via a mobile device, wherein the contextual information comprises one or more minimum performance requirements;

identifying a Wi-Fi network in use for performance of the internet-based activity;

evaluating the performance of the internet-based activity on the Wi-Fi network in use; and in response to determining a deviation from the one or more minimum performance requirements, reconfiguring an eSIM of the mobile device to compensate for the deviation.

2. The method of claim 1, wherein identifying the Wi-Fi network comprises identifying a bandwidth strength and a bandwidth range of the Wi-Fi network.

3. The method of claim 2, wherein the evaluating further comprises:

comparing, periodically, the bandwidth strength of the Wi-Fi network against a minimum bandwidth requirement of the one or more minimum performance requirements.

4. The method of claim 3, wherein the deviation comprises the bandwidth strength of the Wi-Fi network being less than the minimum bandwidth requirement.

5. The method of claim 1, wherein the reconfiguring further comprises:

identifying a capability of the mobile device to connect to two different networks in parallel; and connecting, concurrently, the mobile device to a first network and a second network.

6. The method of claim 1, wherein the reconfiguring further comprises:

selecting a mobile network provider and/or an eSIM-based data plan to be utilized by the mobile device in performance of the internet-based activity.

7. The method of claim 1, further comprising:

determining, based on historical data of the internet-based activity, a forecasted deviation from the one or more minimum performance requirements.

8. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

identifying contextual information of an internet-based activity being performed via a mobile device, wherein the contextual information comprises one or more minimum performance requirements;

identifying a Wi-Fi network in use for performance of the internet-based activity;

evaluating the performance of the internet-based activity on the Wi-Fi network in use; and in response to determining a deviation from the one or more minimum performance requirements, reconfiguring an eSIM of the mobile device to compensate for the deviation.

9. The computer system of claim 8, wherein identifying the Wi-Fi network comprises identifying a bandwidth strength and a bandwidth range of the Wi-Fi network.

10. The computer system of claim 9, wherein the evaluating further comprises:

comparing, periodically, the bandwidth strength of the Wi-Fi network against a minimum bandwidth requirement of the one or more minimum performance requirements.

11. The computer system of claim 10, wherein the deviation comprises the bandwidth strength of the Wi-Fi network being less than the minimum bandwidth requirement.

12. The computer system of claim 8, wherein the reconfiguring further comprises:

identifying a capability of the mobile device to connect to two different networks in parallel; and connecting, concurrently, the mobile device to a first network and a second network.

13. The computer system of claim 8, wherein the reconfiguring further comprises:

selecting a mobile network provider and/or an eSIM-based data plan to be utilized by the mobile device in performance of the internet-based activity.

14. The computer system of claim 8, further comprising:

determining, based on historical data of the internet-based activity, a forecasted deviation from the one or more minimum performance requirements.

15. A computer program product, the computer program product comprising:

one or more computer-readable tangible storage medium and program instructions stored on at least one of the one or more tangible storage medium, the program instructions executable by a processor capable of performing a method, the method comprising:

identifying contextual information of an internet-based activity being performed via a mobile device, wherein the contextual information comprises one or more minimum performance requirements;

identifying a Wi-Fi network in use for performance of the internet-based activity;

evaluating the performance of the internet-based activity on the Wi-Fi network in use; and in response to determining a deviation from the one or more minimum performance requirements, reconfiguring an eSIM of the mobile device to compensate for the deviation.

16. The computer program product of claim 15, wherein identifying the Wi-Fi network comprises identifying a bandwidth strength and a bandwidth range of the Wi-Fi network.

17. The computer program product of claim 16, wherein the evaluating further comprises:

comparing, periodically, the bandwidth strength of the Wi-Fi network against a minimum bandwidth requirement of the one or more minimum performance requirements.

18. The computer program product of claim 17, wherein the deviation comprises the bandwidth strength of the Wi-Fi network being less than the minimum bandwidth requirement.

19. The computer program product of claim 15, wherein the reconfiguring further comprises:

identifying a capability of the mobile device to connect to two different networks in parallel; and connecting, concurrently, the mobile device to a first network and a second network.

20. The computer program product of claim 15, wherein the reconfiguring further comprises:

selecting a mobile network provider and/or an eSIM-based data plan to be utilized by the mobile device in performance of the internet-based activity.

* * * * *